No. 707,821. Patented Aug. 26, 1902.
T. N. CASE.
AIR PUMP.
(Application filed Dec. 4, 1901.)

(No Model.) 9 Sheets—Sheet 1.

WITNESSES:

INVENTOR:—
Theodore N. Case,

BY
ATTORNEY

No. 707,821. Patented Aug. 26, 1902.
T. N. CASE.
AIR PUMP.
(Application filed Dec. 4, 1901.)
(No Model.) 9 Sheets—Sheet 2.

WITNESSES:

INVENTOR:—
Theodore N. Case,
BY
ATTORNEY

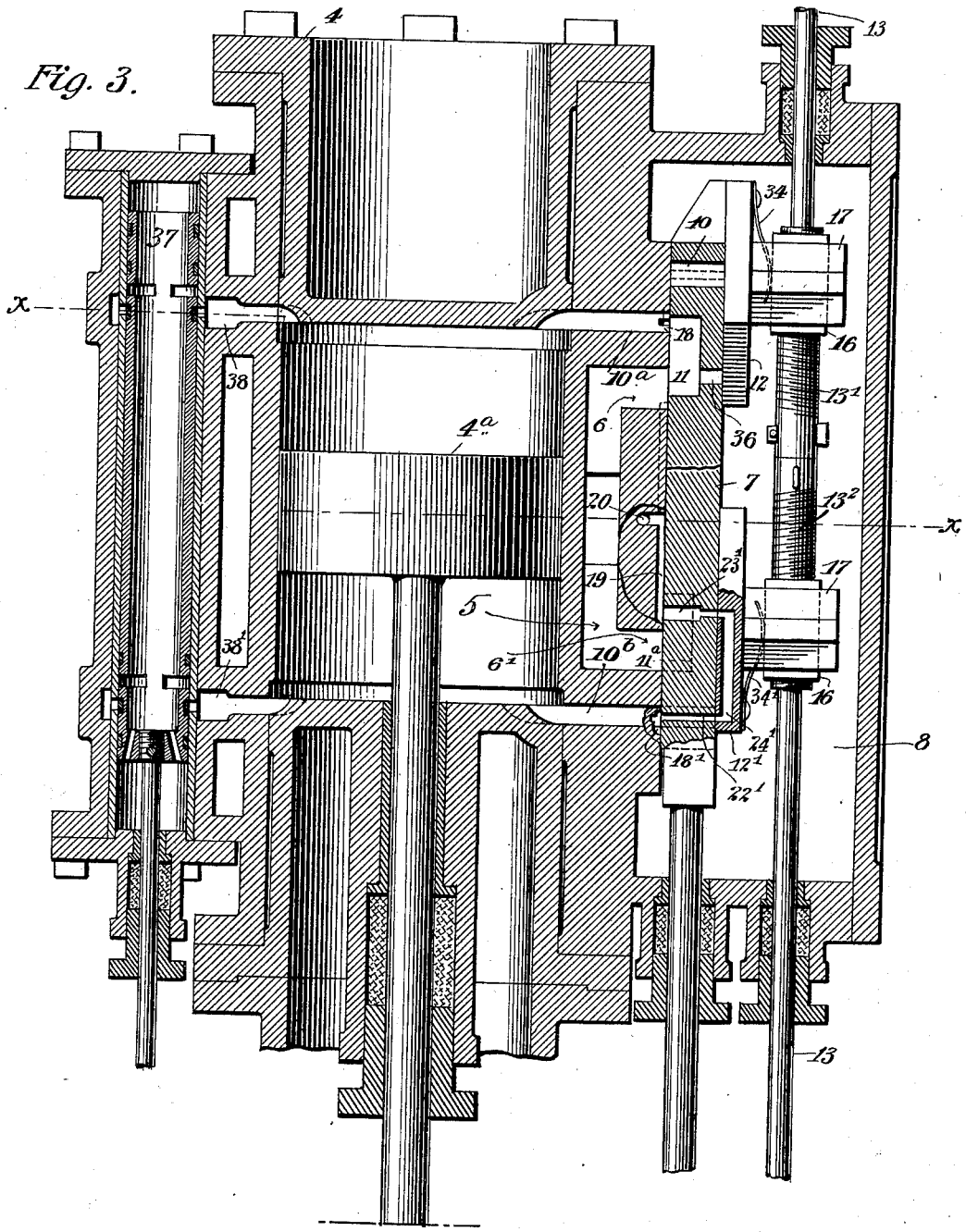

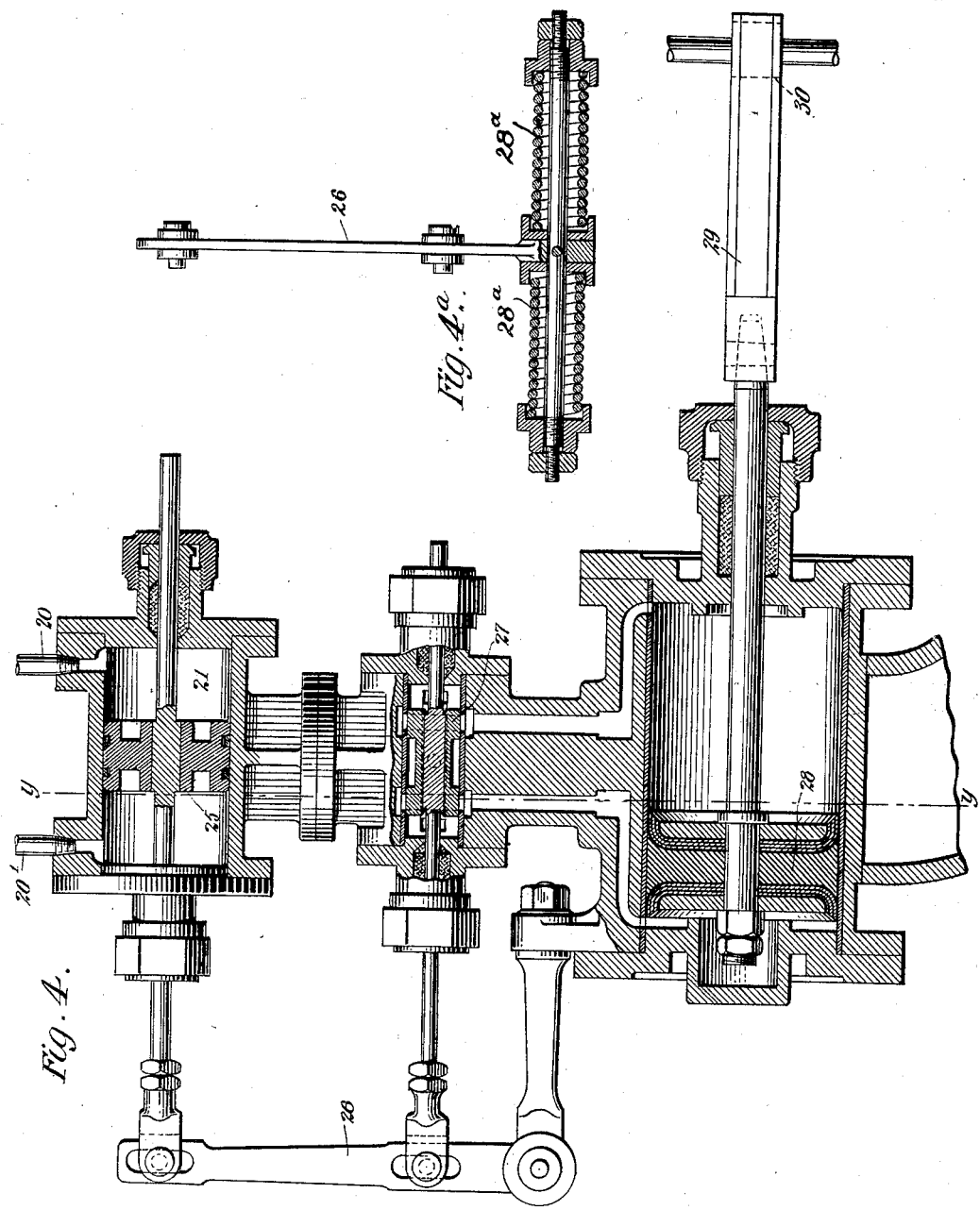

No. 707,821. Patented Aug. 26, 1902.
T. N. CASE.
AIR PUMP.
(Application filed Dec. 4, 1901.)
(No Model.) 9 Sheets—Sheet 5.
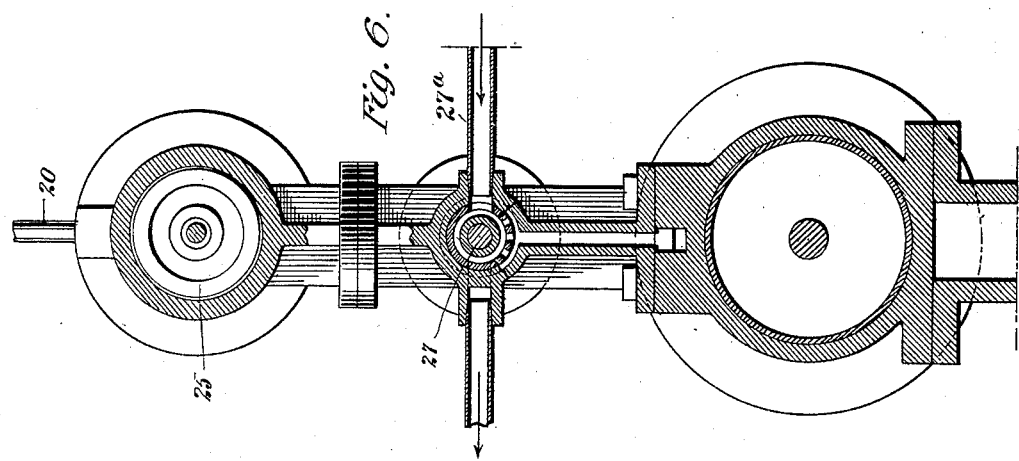
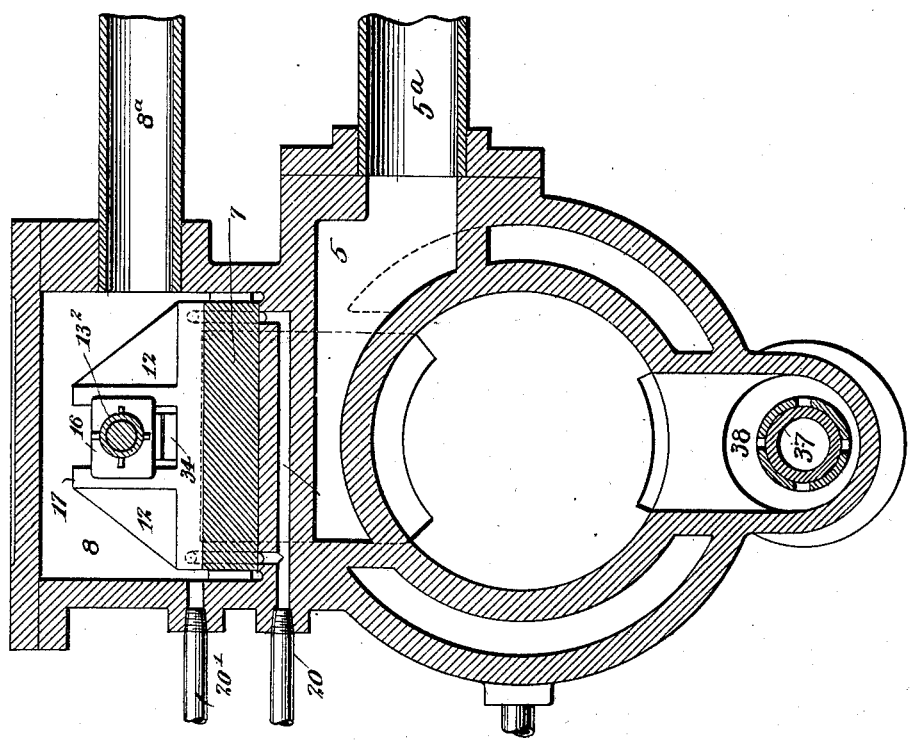
WITNESSES:
INVENTOR:—
Theodore N. Case,
BY
ATTORNEY.

No. 707,821. Patented Aug. 26, 1902.
T. N. CASE.
AIR PUMP.
Application filed Dec. 4, 1901.)
(No Model.) 9 Sheets—Sheet 6.

WITNESSES:

INVENTOR:—
Theodore N. Case,
BY
ATTORNEY

No. 707,821. Patented Aug. 26, 1902.
T. N. CASE.
AIR PUMP.
(Application filed Dec. 4, 1901.)
(No Model.)
9 Sheets—Sheet 7.
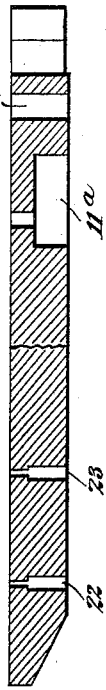
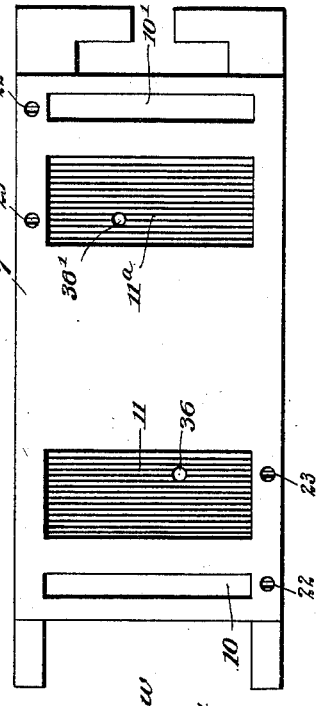
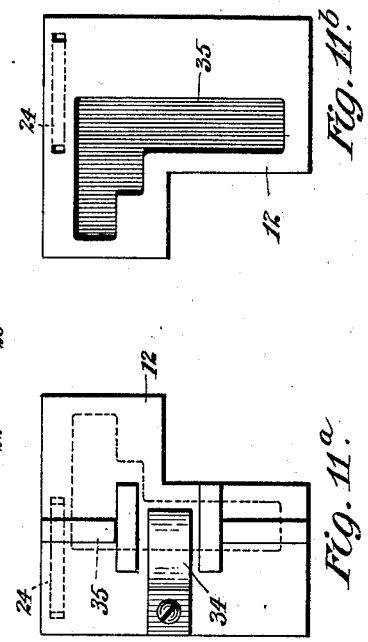
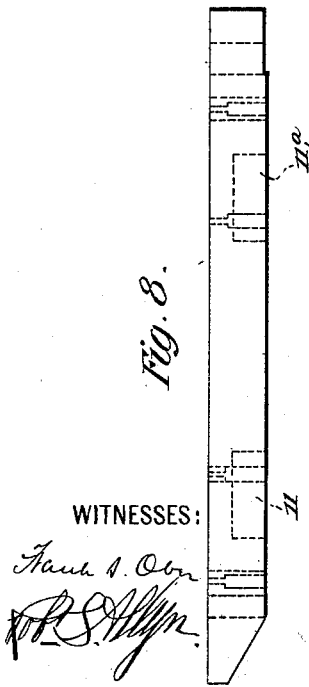
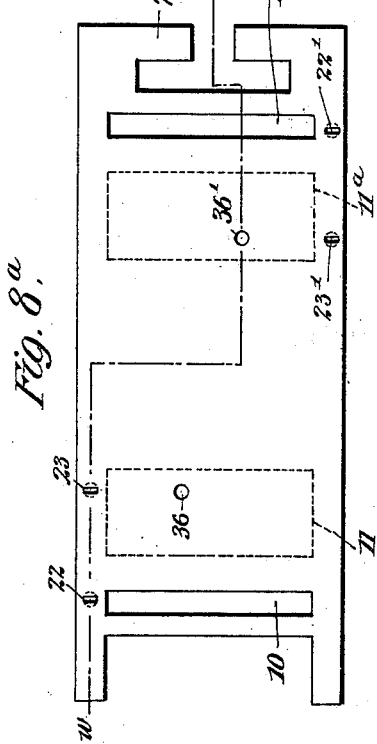
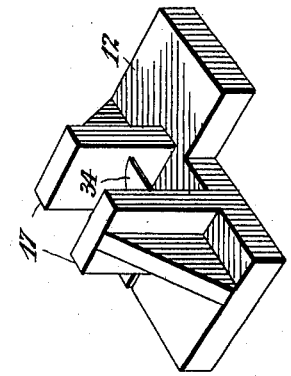
WITNESSES:
INVENTOR:—
Theodore N. Case,
BY
ATTORNEY

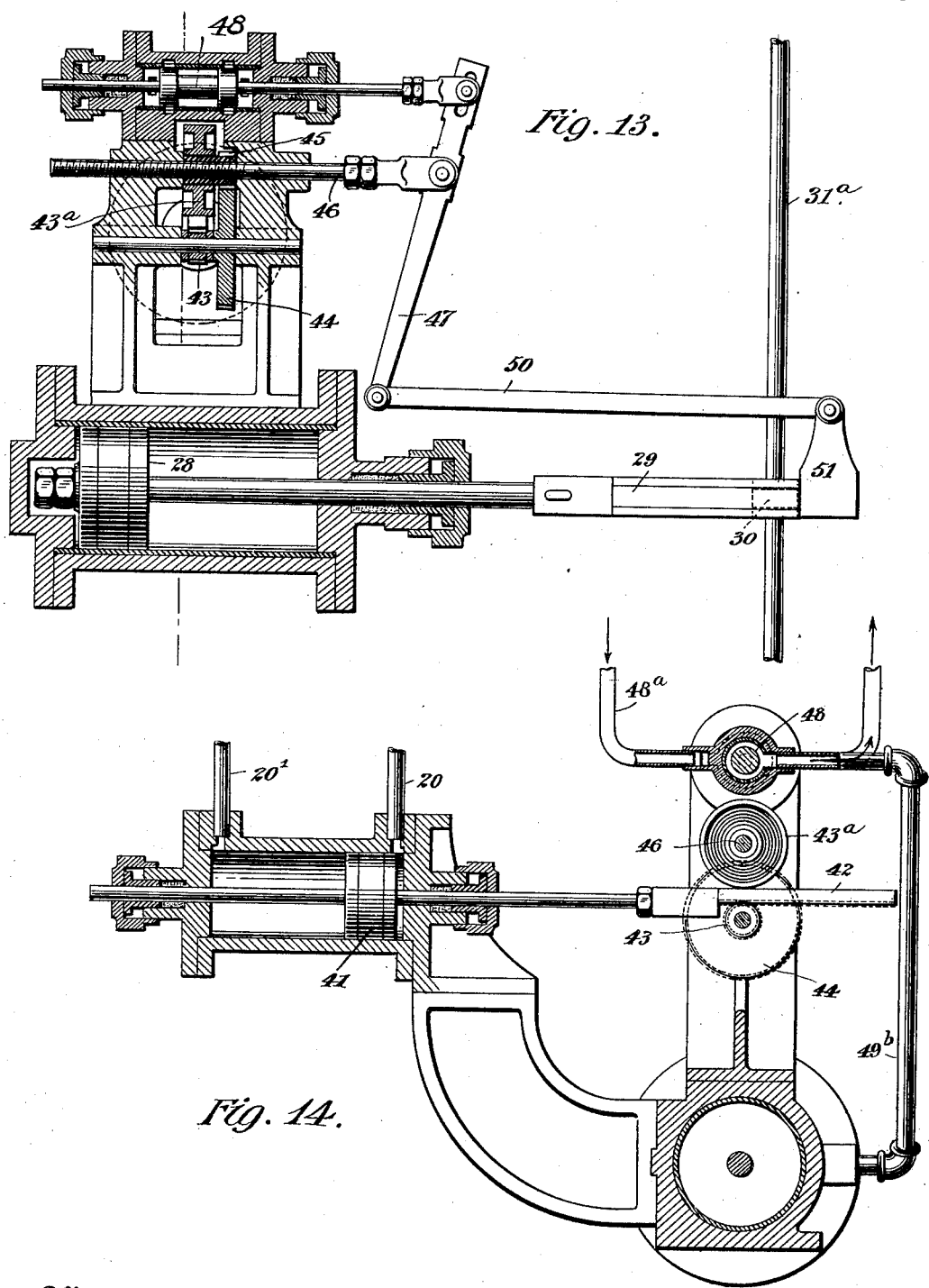

UNITED STATES PATENT OFFICE.

THEODORE N. CASE, OF MOUNT VERNON, NEW YORK.

AIR-PUMP.

SPECIFICATION forming part of Letters Patent No. 707,821, dated August 26, 1902.

Application filed December 4, 1901. Serial No. 84,598. (No model.)

*To all whom it may concern:*

Be it known that I, THEODORE N. CASE, a citizen of the United States, residing at Mount Vernon, county of Westchester, State of New York, have invented certain new and useful Improvements in Air-Pumps, of which the following is a full, clear, and exact description.

My invention relates to improvements in air-pumps, and has for its object to provide a pump which shall be a more efficient and economical mechanism for use as a vacuum-pump or as an air-compressor than those heretofore constructed.
Hitherto in most air-pumps some or all of the valves have been constructed so as to be actuated by air or spring pressure. In my improved pump, however, valves heretofore so actuated are positively actuated. In my improved pump I also provide auxiliary or release valves to keep the discharge-ports closed until the pressure ahead of the moving piston is equal to the discharge pressure. I further provide automatic means for adjusting the position of these auxiliary or release valves for variations of pressure in either the suction or discharge space, or in both. I further provide a new and improved equalizing-valve for equalizing the pressure on both sides of the piston at the beginning of each stroke and other features and combinations pointed out in the claims.

Figure 1:
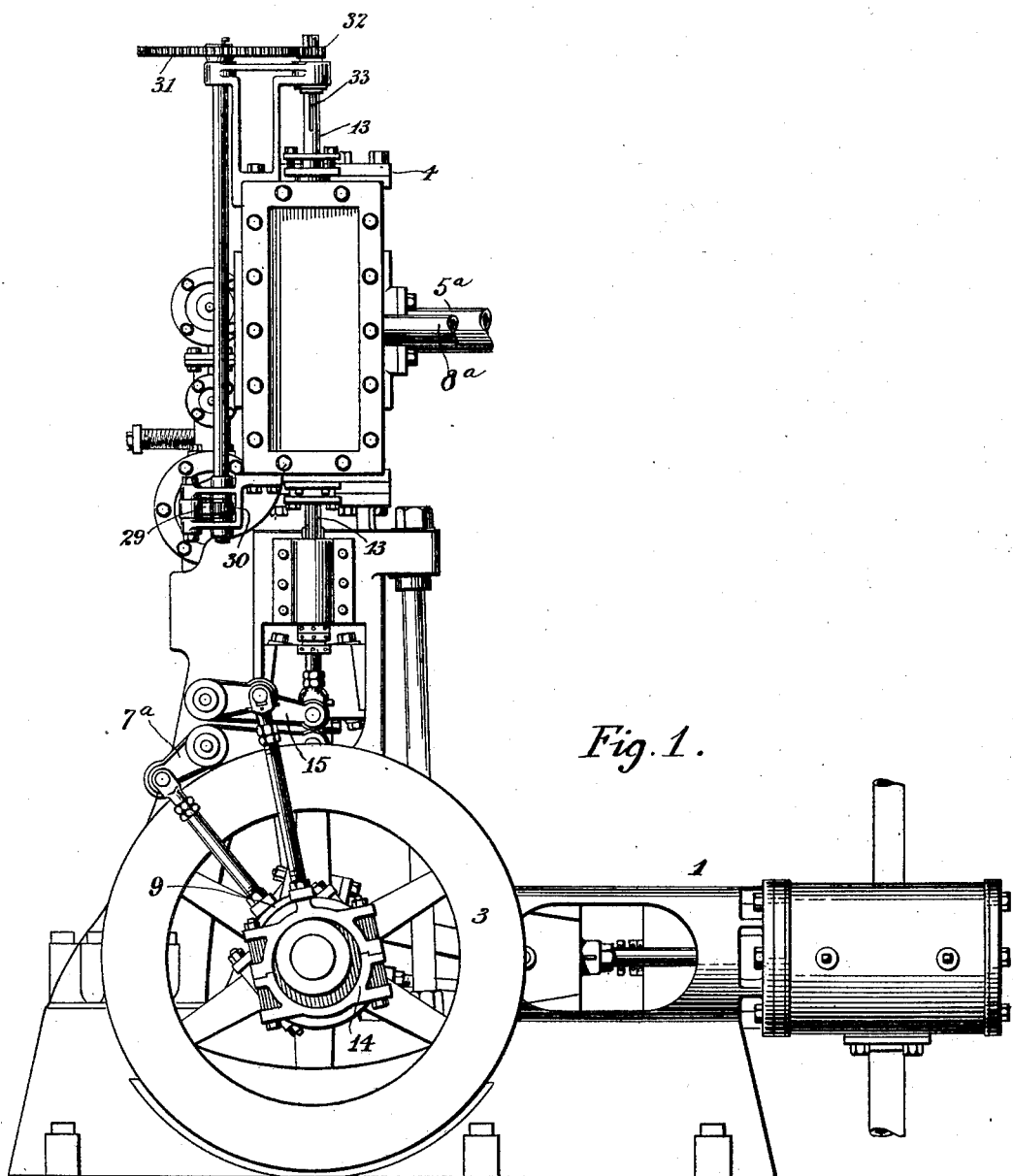
Figure 2:
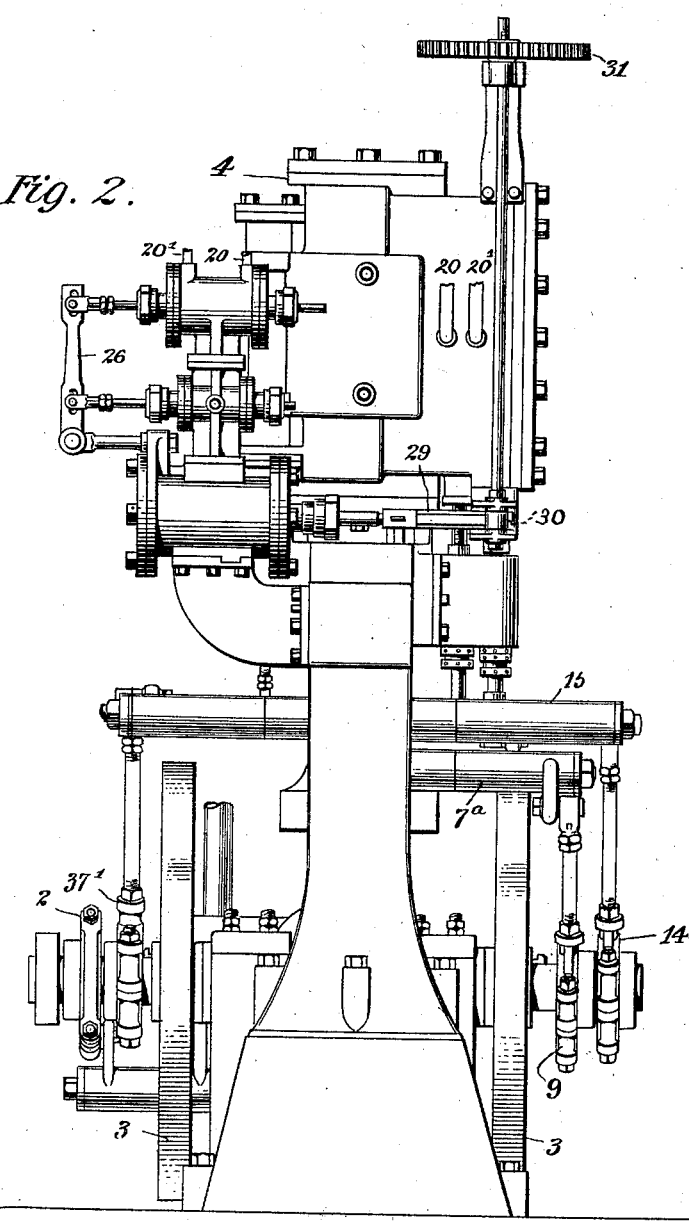
Figure 7:
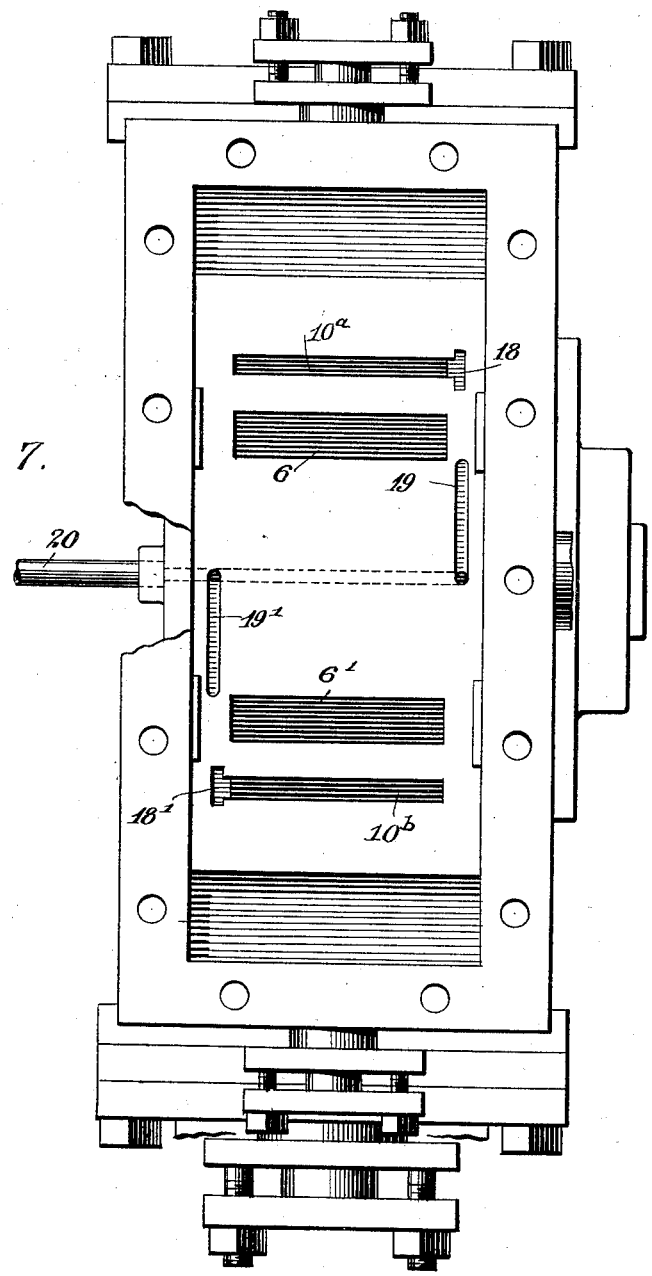
Figure 12:
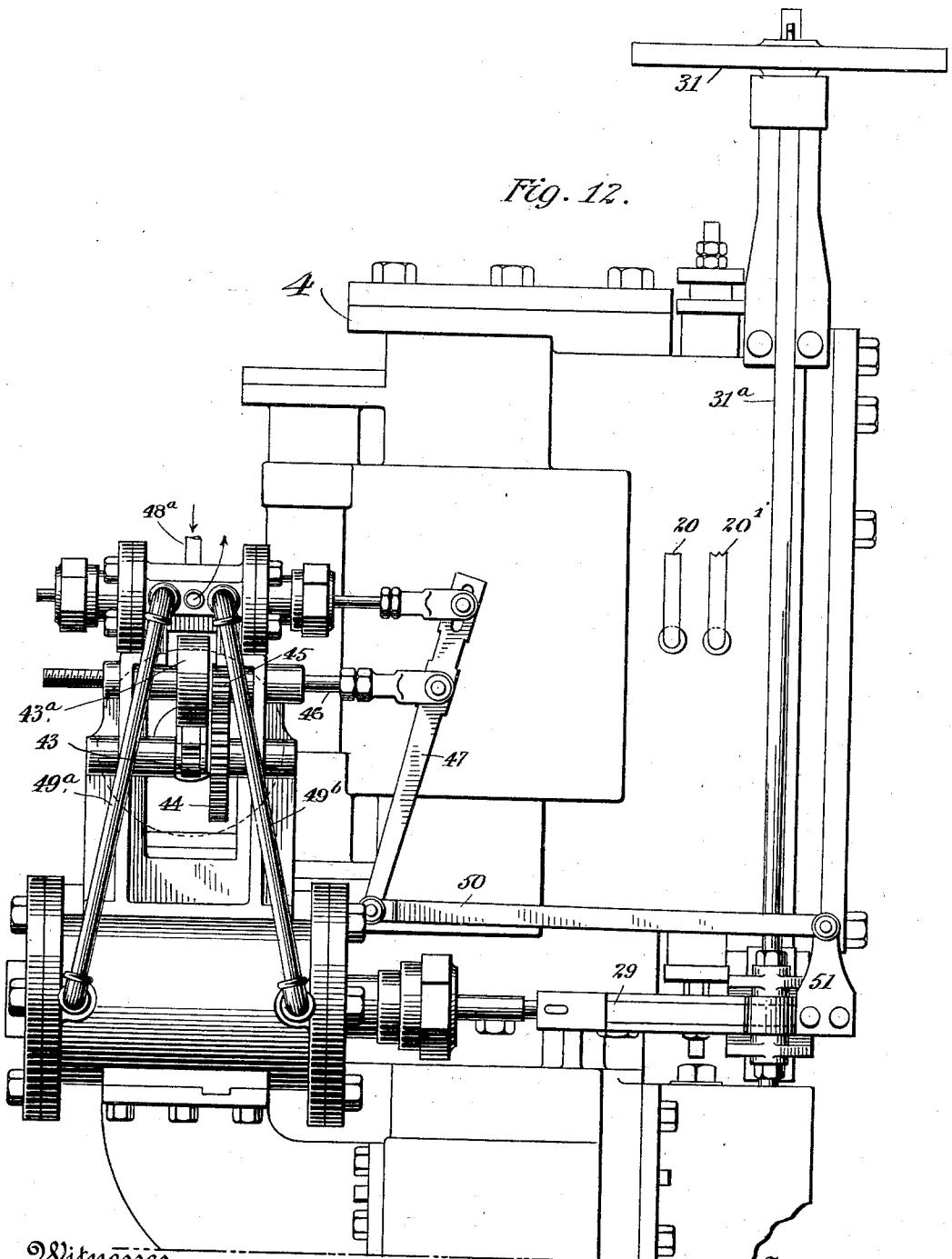

The following is a description of a pump embodying my invention, reference being had to the accompanying drawings, in which—
Figure 1 is a side elevation of the pump with a direct-connected engine. Fig. 2 is an end elevation of the same. Fig. 3 is a view, partly in section, of the pump-cylinder and valves. Fig. 4 shows the mechanism for automatically adjusting the release-valves, the section being mainly on a plane corresponding to that passing through the center of Fig. 7, details being shown by other partial sections corresponding to the plane of openings 18′ 19′ of Fig. 7 and to the plane of orifice 36 of Fig. 8ª. Fig. 4ª is a detail of the same. Fig. 5 is a section of the cylinder on the line $x\ x$ of Fig 3. Fig. 6 is a section on the line $y\ y$ of Fig. 4. Fig. 7 is a plan view of the valve-chamber with the main slide removed. Figs. 8 and 8ª are elevations and plans of the main slide. Figs. 9 and 9ª are a section ($w\ w$, Fig. 8ª) and under view of the main slide. Fig. 10 is a perspective view of a release-valve. Figs. 11ª, 11ᵇ are detail views of the release-valves. Fig. 12 is a modification showing a different release-valve-adjusting mechanism. Figs. 13 and 14 are detail views of the same.

Referring more particularly to the drawings, 1 represents a direct-connected engine with the fly-wheels 3 3 and having its valve operated by the eccentric 2.

4 represents the pump-cylinder with its piston 4ª and having a suction-chamber 5, to which leads the suction-pipe 5ª from the suction-space and the ports 6 6′.

7 is a main slide-valve operated by a rocker-arm 7ª from the eccentric 9. This slide-valve 7 has discharge-ports 10 10′, connecting the ports 10ª 10ᵇ with the valve-chamber 8, and thence through the discharge-pipe 8ª to the discharge-space—*i. e.*, the atmosphere in the case of a vacuum-pump or the receiver in the case of a compressor. It also has suction-ports 11 11ª, connecting the pump-cylinder with the suction-chamber 5. Upon the slide-valve 7 are two slide release-valves 12 12′, which are positively actuated by the rod 13, operated by the eccentric 14 through the rocker-arm 15. These release-valves 12 12′ are so adjusted that they close the passage when the ports 10 10′ of the valve 7 register with the ports 10ª 10ᵇ until the pressure ahead of the piston 4ª equals the atmospheric or receiver pressure, at which instant they open, permitting the compressed air to pass out. The purpose of this is to prevent the air from rushing into the cylinder from the outside or discharge-space as soon as the ports 10 10′ and 10ª 10ᵇ register, only to necessitate its being forced out again as the piston advances. By having release-valves close the ports 10 and 10′ until the inside pressure equals the outside pressure the unnecessary work of forcing out high-pressure air for the larger part of the stroke is avoided. In order to adjust the release-valves 12 12′, they are mounted on the rod 13 by screw-threaded blocks 16, which play in the horns 17. One screw-thread 13′ is left-handed and the other, 13², is right-handed, so that as the rod 13 is turned in one direction the release-valves 12 12′ are brought nearer together, with the result that the release-valves open the ports 10 10′ earlier in the stroke of the piston, and vice versa.

It is evident that the point in the travel of the piston, when the internal pressure equals the pressure in the discharge-space, varies from time to time, depending upon the extent to which the suction-chamber or suction-space is exhausted or the air in the discharge-space relatively compressed, and that the position of the release-valves must be continually adjusted to meet the varying conditions. This adjustment should be automatic, and I have provided means for that end, as follows: In the valve-seat of the slide-valve 7 I have made recesses 18 18', connecting with the discharge-ports 10ᵃ 10ᵇ, and recesses 19 19', connecting with the pipe 20, which leads to a piston-cylinder 21, Fig. 4. In the slide-valve 7 are small ports 22 23 and 22' and 23', which at times register with recesses 18 18' and 19 19'. These ports 22 23 and 22' 23' in turn at times register with the ends of the passages 24 24' in the release-valves 12 12'. The completion of the passages 10ᵃ 18 22 24 23 19 20 and 10ᵇ 18' 22' 24' 23' 19' 20 can take place only once in each revolution of the crank and only while the piston 4ᵃ is approaching the end of the cylinder to which each respectively connects, and then during but a brief period extending from just before till just after the release edges of the release-valves 12 12' uncover the release edges of the ports 10 10'. Any transfer of air through these passages takes place in short puffs as long as the conditions favoring the transfer are unchanged, either out of pump-cylinder 4 into cylinder 21, or vice versa. If the release-valves close the ports 10 10' when the ports 10 10' and 10ᵃ 10ᵇ register and the passages 18 22 23 24 19 and 18' 22' 23' 24' 19' also register, the air-pressure ahead of the piston 4ᵃ is transmitted to one end of the governor air-chamber or piston-cylinder 21 by pipe 20. If this pressure exceeds the pressure of the air in the valve-chamber 8, which is connected to the other end of the air chamber or cylinder 21 by pipe 20', it acts upon the piston 25 to push it toward the left, and in so doing moves the arm 26, which actuates the piston-valve 27, so that it admits water or other fluid from the inlet 27ᵃ, which connects with the central part of the valve-chamber to the left-hand side of the piston 28 from some convenient source having sufficient pressure, and thereby forces piston 28 to the right, moving the rack 29, engaging with the pinion 30 on the shaft of the gear 31. Gear 31 in turn acts upon the gear 32, which is mounted so as to rotate the rod 13 and yet be free to move relatively longitudinally thereon by reason of the spline or feather 33. This rotation of the rod 13 adjusts the release-valves 12 12', as before described, by drawing them together until they open the ports 10 10' as soon as the internal pressure equals the external pressure. In like manner if the pressure within the cylinder ahead of the piston 4ᵃ is less than that in the valve-chamber 8 when the ports 18, 22, 23, 24, and 19 register the excess pressure moves the piston 25 to the right, which moves the valve 27 to the right and admits pressure to the right-hand side of the piston 28, moving the rack 29, gears 31 and 32, and rod 13 in directions the reverse of those above mentioned and moving the release-valves 12 12' apart, so that the uncovering of the ports 10 10' will be delayed. The springs 28ᵃ offer torsional resistance to any tendency of lever 26 to move out of a vertical position which corresponds to the central or closed position of valve 27. When lever 26 is moved from its central position, the unbalanced torsional resistance of springs 28ᵃ will return it again to that position as soon as the pressure on 25, which moved it, is sufficiently reduced. It will thus be seen that the release-valves not only determine when the discharge-ports shall be opened, but that they are automatically adjusted so that they will open these ports only when the internal pressure has reached the proper point.

The release-valves 12 12' are partially held against the valve 7 by springs 34 34'. They are also held to their seats by air-pressure, due to the fact that they have chambers 35 35', which are connected to the suction-chamber 5 by ports 36 36'. If by chance the pressure ahead of the piston 4ᵃ should become excessive, it would overcome the pressure due to the chambers 35 35' and the springs 34 34', and forcing the release-valves 12 12' from their seats escape before doing damage.

Coöperating with the valves 7 and 12 12' is an equalizing-valve 37, which is operated by the eccentric 37' and controls ports 38 38' in the cylinder. This equalizing-valve is so operated by an eccentric 37' that it opens the ports 38 38' for a brief period at the beginning of each stroke of the piston 4ᵃ, during which time the ports 10ᵃ 10ᵇ are closed. This permits the compressed air that remains in the clearance-space to pass to the other side of the piston 4ᵃ, where there is a partial vacuum, thereby equalizing the pressure on both sides, and thus reducing the pressure behind the piston to almost suction pressure. This results in suction almost as soon as the piston starts on its return stroke. In order to make this valve more efficient, I have made it cylindrical and hollow, so that the passage from port 38 to port 38' is through its body and as short as possible. The correct relative positions for the valves and ports and also for the crank and eccentrics operating the piston 4ᵃ and several valves can easily be determined by the Zeuner or any similar diagram.

In the arrangement shown in Figs. 12 to 14 the piston 28, which adjusts the release-valves 12 12' through the rack 29, gear 30, shaft 31ᵃ, and gear 31, is actuated by water or other fluid admitted by the valve 48, which is controlled by the air-piston 41. The piston 41 is actuated by air supplied to its air chamber or cylinder through the pipes 20 20'. When the pressure in the pipe 20 exceeds that in 20', the piston 41 is moved to the left. This, through the rack 42, moves the pinion 43, against which it is held by the roller 43$^a$. The movement of the pinion 43 rotates the gear 44, attached thereto. This engages with the geared screw-nut 45 upon the screw-threaded rod 46. As the rack 42 is forced to the left the nut 45, revolving, forces the rod 46 to the right, thus moving the pivoted arm 47 and opening the valve 48, so as to admit water or other fluid from the inlet 48$^a$, which connects with both ends of the valve-chamber by the pipe 49$^a$ to the left of the piston 28. This piston 28 is thereby forced to the right, moving the rack 29, and thereby rotating the shaft 31$^a$, and through such rotation adjusting the release-valves 12 12', so that the air-pressures in the pipes 20 20' become equal, at which time the valve 48 will have been closed and the piston 28 will cease to move and will remain fixed until the pressures in the pipes 20 20' become again unequal. In case the pressure in the pipe 20' is in excess the valve 48 is opened, so as to admit water or other fluid to the opposite side of the piston 28 by the pipe 49$^b$, in which case the reverse action takes place. In order to obtain a differential action and make the adjusting device more sensitive, I connect the arm 47 by a link 50 to a projection 51 on the end of the rack 29. By this arrangement whenever the piston 28 moves it tends to shut the valve 48 and will completely shut it unless the air-pressure in the pipes 20 20' is so unbalanced as to keep it open.

In the foregoing description I have spoken of the space into which air is forced as the "discharge-space" and that from which it is taken as the "suction-space." In the case of a vacuum-pump the discharge-space is of course the atmospheric air and the suction-space the chamber in which the pressure is reduced below atmospheric pressure. When used as a compressor, the discharge-space is some kind of a receiver for the compressed air and the suction-space is the atmospheric air from which the supply is drawn. In either case there is a difference in pressure at the suction and discharge ports and the principle of operation is the same, differing only in the degree of pressure of the air at the two ports.

In the operation of the pump the eccentrics are adjusted so that all the suction and discharge ports are closed for a brief period at the beginning of each stroke, during which time the eccentric of the equalizing-valve opens and closes the passage from one end of the cylinder to the other, so as to equalize the pressure. The eccentrics are further adjusted so that the suction-port on one end and the discharge-port on the other end of the main slide-valve are made to register with the cylinder-ports when the release-valve ports are closed and so that when the pressure ahead of the piston is the same as external pressure the release-valves uncover the discharge-ports, permitting the air to be forced out of the cylinder into the valve-chamber and thence by the outlet 8$^a$ to the atmospheric air in the case of a vacuum-pump or the receiver in the case of an air-compressor, the adjustment of the release-valves being automatically effected by the pressure-controlled governor. The action is the same for both ends of the cylinder. By reason of the positive action of all the valves a very high speed can be attained, thereby making a small pump do a larger amount of work than heretofore, while the action of the release and equalizing valves prevents high-pressure air from entering the cylinder to be again forced out and increase the effective time of action in the stroke of the piston.

By the term "air-pump" I do not intend to confine my invention to pumps used for air, but wish it to be understood as being applicable for use with any gas, and use the term as meaning atmospheric air or any elastic fluid or gas. Moreover, I do not wish to be understood as limiting the fluid operating the governor system to liquids, since other fluids—such as air, gas, or steam—may be used. My invention, I believe, has features which are fundamentally new and are capable of being adapted to other valves and pistons than those shown and of being incorporated into many modified forms and constructions.

What I claim is—

1. In an air-pump the combination of a pumping-cylinder, a pumping-piston therein, a governor air-chamber, a connection between said pumping-cylinder and said governor air-chamber and positively-actuated means for opening said connection just prior to the opening of the pumping-cylinder discharge-ports and maintaining it closed at all other times, said means being independent of said pumping-piston.

2. In an air-pump the combination of a pumping-cylinder, a pumping-piston therein, a governor air-chamber, a connection between the extreme end of said pumping-cylinder and said governor air-chamber and positively-actuated means for opening said connection just prior to the opening of the discharge-ports of said pumping-cylinder and maintaining it closed at all other times.

3. In an air-pump the combination of a pumping-cylinder, a pumping-piston therein, and main and release valves therefor, a governor air-chamber having a piston therein, one end of said governor air-chamber being connected to the pumping-cylinder and the other subjected to receiver-pressure, means actuated by said governor-air-chamber piston for adjusting said release-valves and positively-actuated means for opening said connection just prior to the opening of the discharge-ports of said pumping-cylinder and maintaining it closed at all other times, said means being independent of said pumping-piston.

4. In an air-pump the combination of a pumping-cylinder, a piston therein, a positively-actuated main discharge-valve, a positively and independently actuated release-valve, a governor for determining the action of said release-valve, a governor air-chamber, a piston therein, a connection between one end of said air-chamber and both ends of said pumping-cylinder, and positively-actuated means for opening the connection with the pumping-cylinder just prior to every discharge of the pumping-cylinder and maintaining it closed at all other times.

5. In an air-pump the combination of a pumping-cylinder, a piston therein, a positively-actuated main valve, a positively-actuated release-valve, and means controlled by the pressure in said cylinder for automatically adjusting said release-valve relatively to said main valve.

6. In an air-pump the combination of a pumping-cylinder, a piston therein, a positively-actuated main valve, a positively and independently actuated release-valve, an air-controlled governor for adjusting said release-valve and pressure-ports connecting said pumping-cylinder with said governor and controlled by said release-valve.

7. In an air-pump the combination of a pumping-cylinder, a piston therein, a positively-actuated main valve, a positively and independently actuated release-valve, a fluid-cylinder containing a piston for adjusting said release-valve, an air-chamber and piston controlling said fluid-cylinder, and a connection between said air-cylinder and said pumping-cylinder controlled by said release-valve.

8. In an air-pump the combination of a positively-actuated main valve, a positively-actuated release-valve movable relatively thereto, a governor for automatically adjusting said release-valve and means controlled by the positions of said main and release valves for actuating said governor.

9. In an air-pump the combination of a main valve, a release-valve, a governor for automatically adjusting said release-valve relatively to said main valve, and air-ports leading to said governor which are controlled by the positions of said main and release valves.

10. In an air-pump the combination of an air-cylinder, a piston therein, a main valve, a positively-actuated release-valve, movable relatively thereto, a governor for automatically adjusting said release-valve relatively to said main valve, said governor being controlled by air-pressure exerted through ports controlled by said release-valve.

11. In an air-pump the combination of a cylinder, a main valve, a positively-actuated release-valve, a rod for actuating said release-valve, means for adjusting said valve by the rotation of said rod and a governor for automatically rotating said rod.

12. In an air-pump the combination of a main valve and a release-valve movable relatively thereto, a rod for adjusting said release-valve by its rotary movement and means for automatically rotating said rod in either direction controlled by the positions of said main and release valves.

13. In an air-pump, a governor consisting of an air-cylinder and pistons therein, a revoluble screw-threaded nut actuated by said pistons, a rod moved therein, a fluid-valve actuated by said rod controlling the entrance and egress of said fluid-pressure in and to the operating-cylinder of the governor.

14. In an air-pump the combination of the cylinder, a piston therein, a main valve, a positively-actuated release-valve consisting of two members, a rod for actuating said members and also adjusting their relative positions.

15. In an air-pump the combination of a cylinder, a piston therein, a main valve, a positively-actuated release-valve consisting of two members, a rod for actuating said members by its longitudinal movement and adjusting their relative positions by its axial rotation.

16. In an air-pump a governor for adjusting a release-valve having a fluid-operating cylinder, a piston therein, a fluid-valve controlling the ports to said cylinder, a movable rod for actuating said valve through a lever connected by a link to the rod of the piston in the operating-cylinder and to said valve.

17. In an air-pump the combination of a cylinder, a reciprocating piston therein, a positively-actuated main valve, a positively-actuated release-valve, a positively-actuated equalizing-valve establishing a connection between the two ends of the cylinder when the main-valve ports are out of register with the cylinder-ports.

18. In an air-pump the combination of a cylinder, a piston therein, a main valve, a release-valve having a chamber connected with a low-pressure source and acting to hold said valve to its seat.

19. In an air-pump the combination of a cylinder, a piston therein, a main valve, a release-valve having a chamber connected with the suction-chamber of said pump and acting to hold said valve to its seat.

20. In an air-pump, the combination of the cylinder 4, a piston $4^a$, the main valve 7, the release-valve 12 and equalizing-valve 37, and means for actuating the same.

21. In an air-pump the combination of the cylinder 4, the piston $4^a$, a main valve 7, a release-valve 12, a governor therefor having an air-chamber and an air-passage leading thereto controlled by the positions of said valve 12 and said main valve 7.

THEODORE N. CASE.

Witnesses:
H. B. BROWNELL,
L. VREELAND.